United States Patent [19]

Seimiya et al.

[11] Patent Number: 4,472,724

[45] Date of Patent: Sep. 18, 1984

[54] ELECTROSTATIC IMAGE REPRODUCING APPARATUS

[75] Inventors: Ryubun Seimiya; Shigeru Inowa, both of Hino; Noriyoshi Tarumi, Hachioji; Masahiko Matsunawa, Hachioji; Hiroshi Tokunaga, Hachioji, all of Japan

[73] Assignee: Konishiroku Photo Industry Co., Ltd., Tokyo, Japan

[21] Appl. No.: 249,388

[22] Filed: Mar. 31, 1981

[30] Foreign Application Priority Data

Apr. 9, 1980 [JP] Japan ................................ 55-45729

[51] Int. Cl.[3] ............................................ G01D 15/06

[52] U.S. Cl. .................................................. 346/159

[58] Field of Search ............................ 346/153.1, 159; 358/300, 296; 455/602; 250/551

[56] References Cited

U.S. PATENT DOCUMENTS 3,751,671 8/1973 Maniere et al. ..................... 455/602

4,268,160 5/1981 Muramatsu ...................... 346/153.1

*Primary Examiner*—Thomas H. Tarcza

*Attorney, Agent, or Firm*—Jordan B. Bierman; Linda Bierman

[57] ABSTRACT

An electrostatic recording apparatus comprising an ion modulator, a driving circuit for transforming a first image signal into a second image signal and for applying said second image signal to the ion modulator, a member for forming electrostatic latent image, and a photon coupled isolator. A voltage of the second image signal is higher than a voltage of the first image signal. The first image signal is supplied to the driving circuit through the photon coupled isolator. The ion modulator is a multilayered ion modulator comprising a layer of insulating material, a continuous layer of conductive material and a segmented layer of conductive material on the other side of said insulating layer. Each segment of the segmented conductive layer is insulatively isolated from each other segment. The multilayered ion modulator has at least one of row of apertures formed therethrough. A segment of the segmented conduction layer is formed around each aperture.

3 Claims, 4 Drawing Figures

ELECTROSTATIC IMAGE REPRODUCING APPARATUS

BACKGROUND OF THE INVENTION

1. Field of the Invention

The present invention relates to an electrostatic image reproducing apparatus using a multilayered ion modulator.

2. Description of the Prior Art

It has hitherto been known a method for electrostatic image reproduction using a multilayered ion modulator in which a layer of insulating material is inserted between a pair of layers, one of which is a segmented layer of conductive material and the other of which is a continuous layer of conductive material, and said multilayered ion modulator has at least one of row of apertures formed therethrough.

FIG. 1 is a schematic view showing the principle of said prior art method for electrostatic image reproduction. As shown in FIG. 1, a corona charger 2 having a corona wire is arranged above the continuous layer of conductive material 1*a* of a multilayered ion modulator 1, and a member 3 for forming an electrostatic latent image of dielectric substance or photoconductor is arranged below a segmented layer of conductive material 1*b* of said ion modulator 1. A backing electrode 4 is arranged direct below the member 3 for forming electrostatic latent image. The member 3 for forming electrostatic latent image and the backing electrode 4 are normally made as a unit and form an electrostatic recording device. A high DC voltage is applied by a DC power source 5 on the corona wire of the corona charger 2. A high DC voltage, whose polarity is reverse to that of the above mentioned DC voltage is applied on the backing electrode 4 by the DC power source 5.

An electrostatic latent image corresponding to an image reproducing signal S can be formed on the surface of the member 3 for forming electrostatic latent image, because an ion flow which is accelerated to the backing electrode 4 is controlled according to the image reproducing signal S and passing through small apertures 1*c* of the ion modulator 1, when equipotential is given on the continued conductive layer 1*a* of the ion modulator 1 and a signal corresponding to the image reproducing signal S is applied on the segmented conductive layer 1*b* by a control circuit 6 while ions are being generated by the corona charger 2. In said image reproducing method for electrostatic image reproduction, a high voltage of about 2 KV is normally applied between the ion modulator 1 and the backing electrode 4.

In the transfer type electrostatic image reproducing apparatus in which an electrostatic latent image is formed on an electrostatic latent image forming member of a dielectric substance, developed by a developer and transferred on a recording paper, such devices as a developing device, a transfer device, a separating device, a charge removing device, and a cleaning device etc. are arranged in the vicinity of the member for forming electrostatic latent image. However, in the current desire for compactness of the apparatus, the space for said devices is limited, so that in view of the electrical insulation for devices or parts near the backing electrode it is undesirable to apply a high voltage on the backing electrode arranged directly below the electrostatic latent image forming member. If a high voltage is applied to the backing electrode, a strong electrical insulating treatment must be made, so that technical and economical problems arise.

The inventors have perceived the fact that the above problems in the electrostatic image reproducing process can be eliminated if whenever a high voltage is applied, the backing electrode should be grounded whereas a high voltage is applied on the ion modulator, and photon coupled isolators are used for separating electrically the ion modulator drive circuit from the image reproducing signal generating portion and the drive signal generating portion. According to the present invention, the effect of the high voltage with respect to the devices or parts near the backing electrode can be eliminated because the backing electrode is maintained at zero potential, and a high voltage need be applied only on the ion modulator and the drive circuit thereof. Furthermore, the image reproducing apparatus of the present invention is advantageous both technically and economically because the signal transmission system of the image reproducing signal and the driving signal to the driving circuit is readily treated by the usual electrical insulating technique.

Other objects and features of the present invention will be made apparent from the following description taken along with the accompanying drawings.

DESCRIPTION OF THE PREFERRED EMBODIMENT

Figure 1:
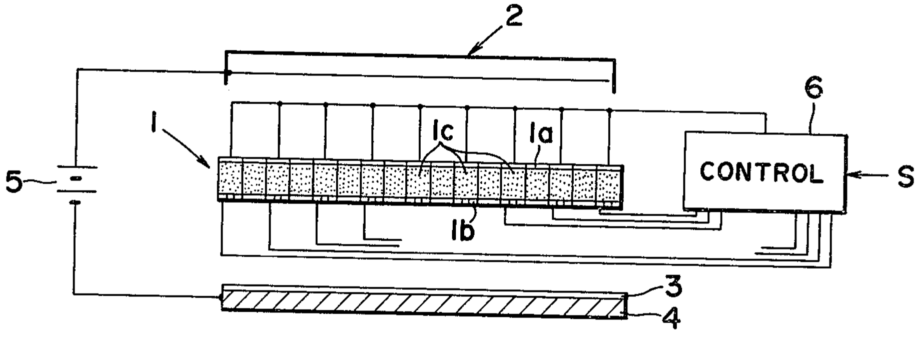
PRIOR ART FIG. 1
FIG. 1 is a schematic view showing the principle of the electrostatic latent image reproduction by using a multilayered ion modulator.
Figure 2:
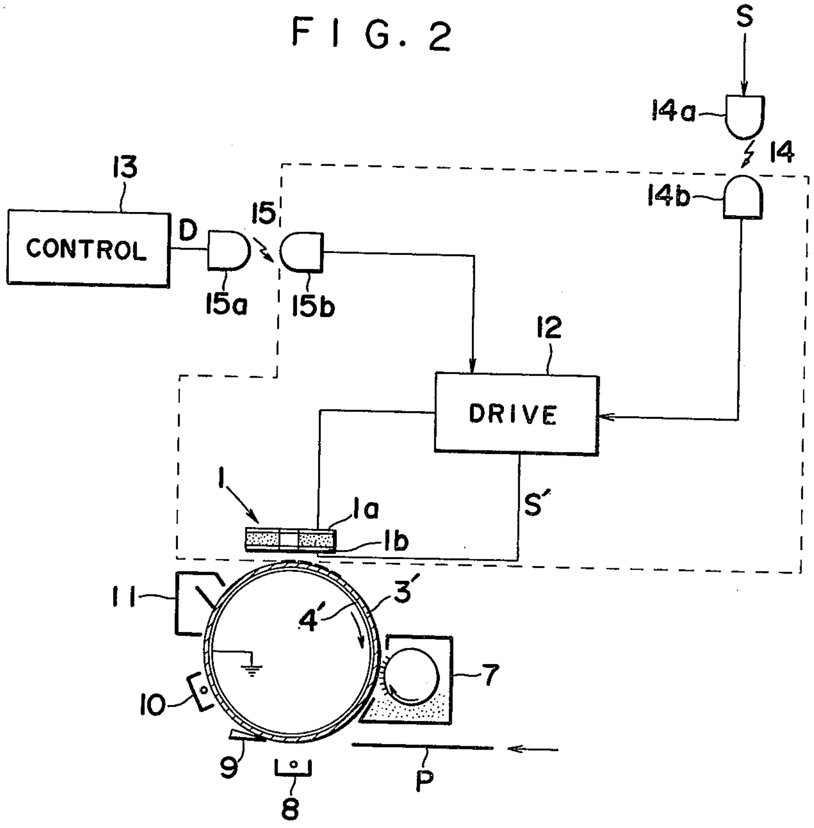
FIG. 2 is a view showing an essential portion of one embodiment of the electrostatic image reproducing apparatus according to the present invention.

An embodiment of the present invention will now be explained with reference to FIG. 2.

In the embodiment shown, a rotary drum 4' made of conductive materials is used as the backing electrode, and a layer of a dielectric substance 3' formed on the surface of the former is used as the member for forming electrostatic latent image whereas the rotary drum 4' is grounded.

About the rotary drum 4', there are arranged: a developing apparatus 7 for developing an electrostatic latent image which is formed on the layer of the dielectric substance 3' by an ion modulator 1; a transfer device 8 for transferring a visualized image after development to the recording paper P; a separating device 9 for separating the recording paper P after the transfer out of the layer of the dielectric substance 3'; a charge removing device 10 for removing the charges which are left on the layer of the dielectric substance 3' after the separation; and a cleaning device 11 for removing the toner which is left on the layer of the dielectric substance 3'. The ion modulator 1 has its continuous layer 1*a* of conductive material 1*a* supplied with a high voltage of about 2 KV by an electrode driving circuit 12, and its the segmented layer of conductive material 1*b* with an electrical image signal S' based upon such a high voltage as a reference potential as is applied upon the continuous layer of conductive material 1a. An electrical image signal S and a driving signal D are supplied to the electrode driving circuit 12. The electrical image signal S may be an electrical information signal including not only a recording information of a computer or an information to be transmitted through a communication line but also an electrical image signal which is obtained by transforming an optical image information by a solid state image sensor such as a charge coupled device (CCD) image sensor. The driving signal D is a synchronous signal such as a clock signal for determining the timing or the order at which the electrical image signal S' is applied to the ion modulator 1 and is generated by a driving control circuit 13.

Both the electrical image signal S and the driving signal D thus far described are applied to the electrode driving circuit 12 through high speed photon coupled isolators 14 and 15, respectively. These photon coupled isolators are constructed, as is well known in the art, by integrally packaging a light emitting diode (LED) and a photodetector, of which the light emitting diode is operative to emit an intensity of light according to the input signal and the photodetector is operative to apply a signal according to the intensity of light received. In the embodiment being described, the portion surrounded by broken lines in FIG. 2, as shown, i.e., the ion modulator 1 and the electrode driving circuit 12, photodetecting portions 14b and 15b of the photon coupled isolators 14 and 15, form the high voltage system. By applying the electrical image signal S and the driving signal D to the light emitting portions 14a and 15a of the photon coupled isolators 14 and 15, moreover, the light emitting portions 14a and 15a and the photodetecting portions 14b and 15b are electrically isolated but are optically connected. With this arrangement of the units and parts constituting the electrostatic recording apparatus, that portion requiring electrically insulating treatment against high voltage is sufficiently identified by the portion indicated by the broken lines, and other units, parts and signal transmission system can be simply treated by the usual electrical insulation means so that the embodiment being described is advantageous both technically and economically. The photon coupled isolators 14 and 15 preferred are of the high speed type having excellent frequency response, thus making it possible to increase the recording speed.

In the above embodiment, the transfer type electrostatic recording apparatus of rotary drum type is utilized. However, the present invention is also applicable in the same manner to the transfer type electrostatic recording apparatus using a member for forming electrostatic latent image which is mounted on an endless belt or the non-transfer type electrostatic recording apparatus.

The arrangement of the photon coupled isolators will now be explained with reference to FIGS. 3 and 4.

Figure 3:
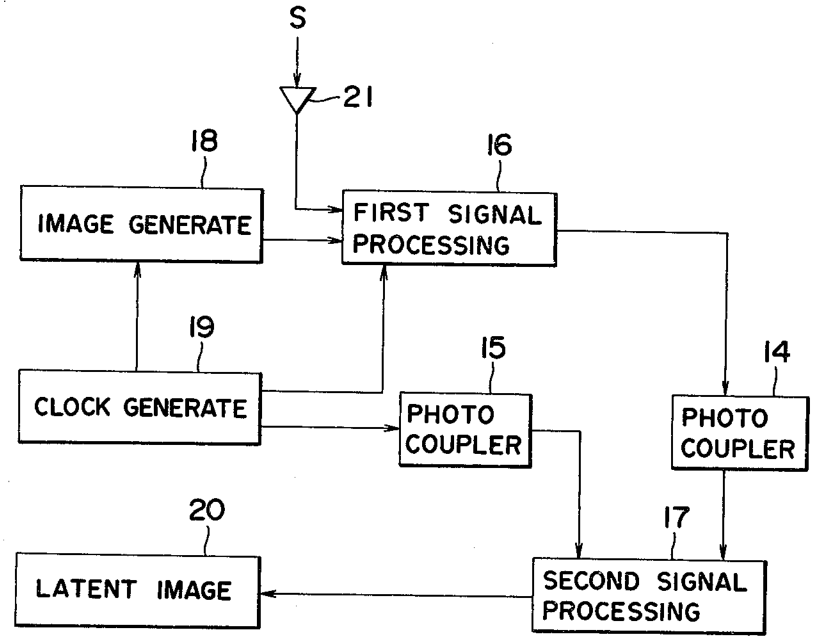
FIG. 3 is a block diagram explaining the arrangement of photon couplers of the electrostatic image reproducing apparatus according to the present invention.
Figure 4:
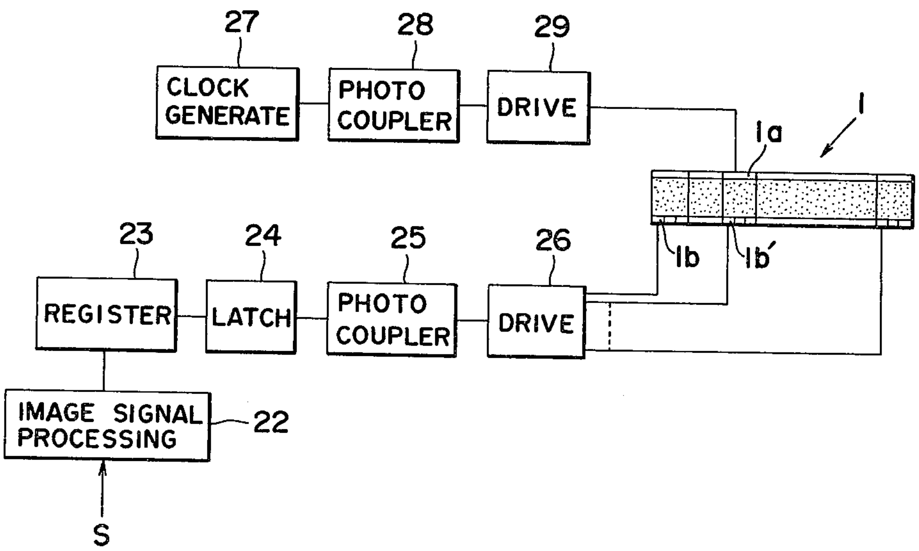
FIG. 4 is a block diagram showing one embodiment of a signal processing unit shown in FIG. 3.

As shown in FIG. 3, the photon coupled isolator 14 is arranged between a first signal processing unit 16 and a second signal processing unit 17. The first signal processing unit 16 is one whose output is at a relative low voltage whereas the second signal processing unit 17 is one whose output is at a high voltage such as several hundreds to several thousands volts. In FIG. 3, 18 denotes a picture image reproducing signal generating unit such as an image sensor device, 19 denotes a clock signal generating circuit, and 20 denotes an electrostatic latent image forming unit. To the first signal processing unit 16, it may be possible to apply an electrical image signal S from the outside through an amplifier 21, in addition to a signal from the image reproducing signal generating unit 18.

A concrete example of the aforementioned first and second signal processing units 16 and 17 will now be explained with reference to FIG. 4. In FIG. 4, 22 denotes an image reproducing signal processing circuit including circuits for multiple magnification copying operations, anti-foggation and contrast adjustment etc.

23 denotes a shift register, 24 denotes a latch circuit, 26 denotes an electrode driving circuit for switching and driving at a high voltage the segmented layer of conductive material 1b, 1b' . . . of the multilayered ion modulator 1, 27 denotes a clock generating circuit, 29 denotes a driving circuit for driving the continuous layer of conductive material 1a of the multilayered ion modulator 1, and 25 and 28 are photon coupled isolators. The position of the photon coupled isolator 25 is not necessarily limited to the position shown in FIG. 4, as it may be possible to place it between the image reproducing signal processing circuit 22 and the shift register 23.

What is claimed is:

1. In an electrostatic recording apparatus of the type in which a signal source produces an image signal to be impressed upon an image receiving member to form an electrostatic latent image thereon through the means of an ion modulator, the improvement comprising a drive circuit receiving said produced image signal and transferring the same into a second image signal of substantially higher voltage than that of the first image signal, means applying said second image signal to said ion modulator, a photon coupled isolator connecting the source of the first image signal to said drive circuit, means maintaining said image receiving member at zero potential, whereby the high voltages from said drive circuit and applied to said ion modulator are isolated from both the signal source and said member, control means producing a timing signal applied to said drive circuit, and a second photon coupled isolator connecting said control means to said drive circuit, whereby the high voltage emanating from said drive circuit and applied to said ion modulator is likewise isolated from said control means.

2. An electrostatic recording apparatus as set forth in claim 1, in which said ion modulator is a multilayered ion modulator comprising a layer of insulating material, a continuous layer of conductive material and a segmented layer of conductive material on the other side of said insulating layer, each segment of the segmented conductive layer being insulatively isolated from each other segment, said multilayered ion modulator having at least one of row of apertures formed therethrough, a segment of the segmented conduction layer being formed around each aperture.

3. An electrostatic recording apparatus as set forth in claim 1, wherein the photon coupled isolator is a high speed photon coupled isolator.

* * * * *